(12) United States Patent
Huynh

(10) Patent No.: US 10,703,398 B1
(45) Date of Patent: Jul. 7, 2020

(54) TWO-ARM DOLLY ATTACHMENT

(71) Applicant: Nhut Huynh, Savannah, GA (US)

(72) Inventor: Nhut Huynh, Savannah, GA (US)

( * ) Notice: Subject to any disclaimer, the term of this patent is extended or adjusted under 35 U.S.C. 154(b) by 0 days.

(21) Appl. No.: 16/504,006

(22) Filed: Jul. 5, 2019

(51) Int. Cl.
*B62B 1/12* (2006.01)
*B62B 1/14* (2006.01)
*B65B 67/12* (2006.01)

(52) U.S. Cl.
CPC ........ *B62B 1/14* (2013.01); *B62B 1/12* (2013.01); *B65B 67/1205* (2013.01)

(58) Field of Classification Search
CPC .......... B62B 1/12; B62B 1/14; B65B 67/1205
USPC .................... 280/35, 47; 224/401
See application file for complete search history.

(56) References Cited

U.S. PATENT DOCUMENTS

| | | | |
|---|---|---|---|
| 5,163,695 A | 11/1992 | Pakowsky | |
| 5,845,915 A * | 12/1998 | Wilson | B62B 1/14 280/47.19 |
| 6,019,381 A * | 2/2000 | Krawczyk | B62B 1/002 211/126.1 |
| 6,135,466 A * | 10/2000 | Irwin | B62B 1/12 280/47.19 |
| 7,066,475 B2 * | 6/2006 | Barnes | B62B 1/14 280/35 |
| 9,266,545 B2 * | 2/2016 | Robinson | B62B 1/26 |
| D819,291 S * | 5/2018 | Turcotte | D34/5 |
| 10,351,339 B1 * | 7/2019 | Moens | B65B 67/1233 |
| 10,414,420 B1 * | 9/2019 | Doubet | B62B 1/264 |
| 10,525,997 B1 * | 1/2020 | Su | B62B 5/06 |
| 10,618,538 B1 * | 4/2020 | Huynh | B62B 1/14 |
| 2009/0152825 A1 * | 6/2009 | Adams | B65F 1/1468 280/47.31 |
| 2010/0181737 A1 * | 7/2010 | Reinicke | B62B 1/262 280/47.19 |
| 2014/0110447 A1 * | 4/2014 | Hilley | B62B 1/26 224/401 |

* cited by examiner

*Primary Examiner* — Justin M Larson
(74) *Attorney, Agent, or Firm* — Sanchelima & Associates, P.A.; Christian Sanchelima; Jesus Sanchelima

(57) ABSTRACT

A two-arm dolly attachment is disclosed herein. The two-arm dolly attachment includes a first arm, a second arm, a first substantially straight first arm and a second substantially straight second arm. The first arm includes a width adjusting opening. The second arm includes multiple securing member openings. Each aforementioned arm is mounted through securing members which are received by butterfly nuts. The first arm mounts to the second arm. The first substantially straight arm mounts to the first arm. The second substantially straight arm mounts to the second arm. The first and second substantially straight arm mount to one another. The butterfly nuts allow the two-arm dolly attachment to assemble and dissemble for storage. There are two pairs of clasping members which are adjustable to allow the two-arm dolly attachment to attach to dollies of various sizes. The width of the two-arm dolly attachment is adjusted.

7 Claims, 8 Drawing Sheets

ND DOLLY ATTACHMENT

II. BACKGROUND OF THE INVENTION

1. Field of the Invention

The present invention relates to a two-arm dolly attachment and, more particularly, to two-arm dolly attachment that can be accommodated to fit dollies of various sizes in order to better secure items of distinct sizes being mounted and moved thereon.

2. Description of the Related Art

Several designs for dolly attachments have been designed in the past. None of them, however, include a two-arm dolly attachment that allows fitting of the attachment to dollies of varies shape, size and thickness. There is often a need to secure objects being transported via a dolly in a better way. This is often due to the large size of the objects or items. It is unsafe to transport them without properly securing the objects onto the dolly. Also, often times it takes more than one person to operate and transport the dolly with the objects in the case that they are cumbersome objects. Hence, there is a need for an attachment that can make use of a dolly when transporting cumbersome objects to be more efficient as to be operable by only one person. Additionally, the present invention increases the safety of transporting large objects via a dolly.

Applicant believes that a related reference corresponds to U.S. Pat. (published application) No. U.S. Pat. No. 5,163,695A issued to Lee A. Pakowsky for Dolly Attachment for Carrying Flat Furniture Components. Pakowky's art is an attachment for carrying flat furniture components on a dolly, which includes a main frame for supporting the furniture components, a main frame attachment arrangement which allows for detachably attaching the main frame to the dolly in a raised position, a pivot frame attached to the main frame which is for supporting the main frame, a pivot frame attachment arrangement which allows for detachably attaching the pivot frame to the dolly, and a strapping arrangement for strapping the furniture components to the main frame. However, it differs from the present invention because the Pakowsky reference is limited in the items that can be carried thereon. It is meant for furniture on a dolly. Additionally, the height is the limiting factor as that is along where the furniture is secured down to the dolly. While the present invention secures objects along their width and can work with dollies of any size to secure objects of any size as it is adjustable. Further, the present invention is collapsible in order to allow easy storage and transportation from needed location to needed location.

Other documents describing the closest subject matter provide for a number of more or less complicated features that fail to solve the problem in an efficient and economical way. None of these patents suggest the novel features of the present invention.

III. SUMMARY OF THE INVENTION

It is one of the objects of the present invention to provide a two-arm dolly attachment that can be mounted onto dollies of various shapes, sizes and widths.

It is another object of this invention to provide a two-arm dolly attachment that can secure items of various sizes and shapes onto a dolly when the items are being transported via means of the dolly.

It is still another object of the present invention to provide a two-arm dolly attachment that is easy and quick to assemble and disassemble.

It is another object of the present invention to provide a two-arm dolly attachment that is easily collapsible for easy storage.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

Figure 6:
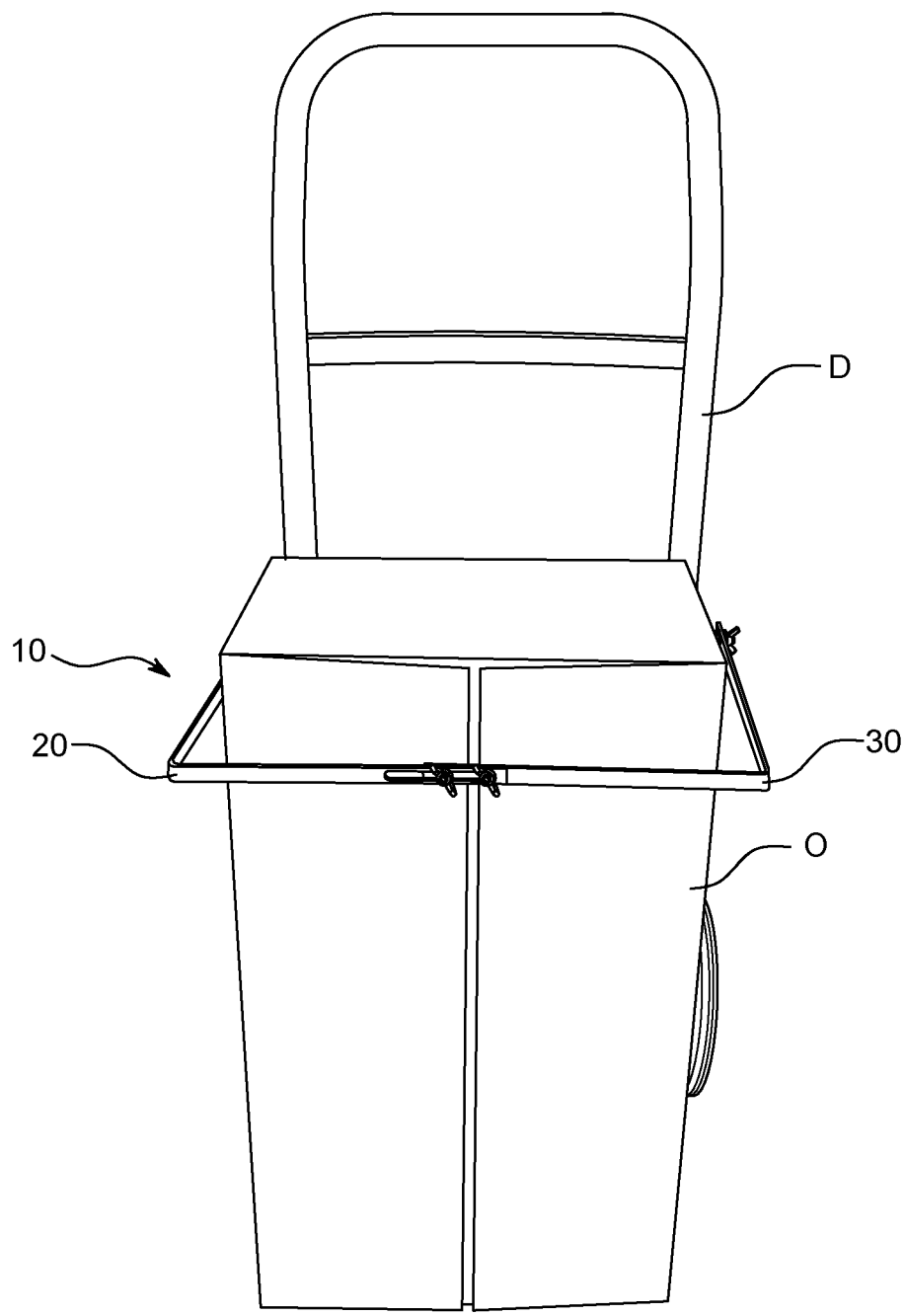
Figure 7:
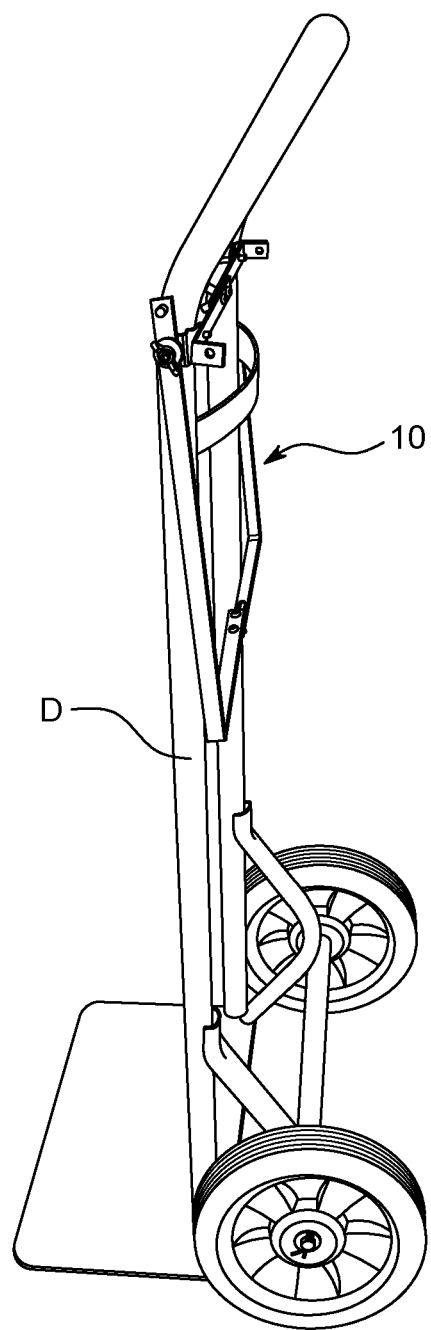
Figure 8:
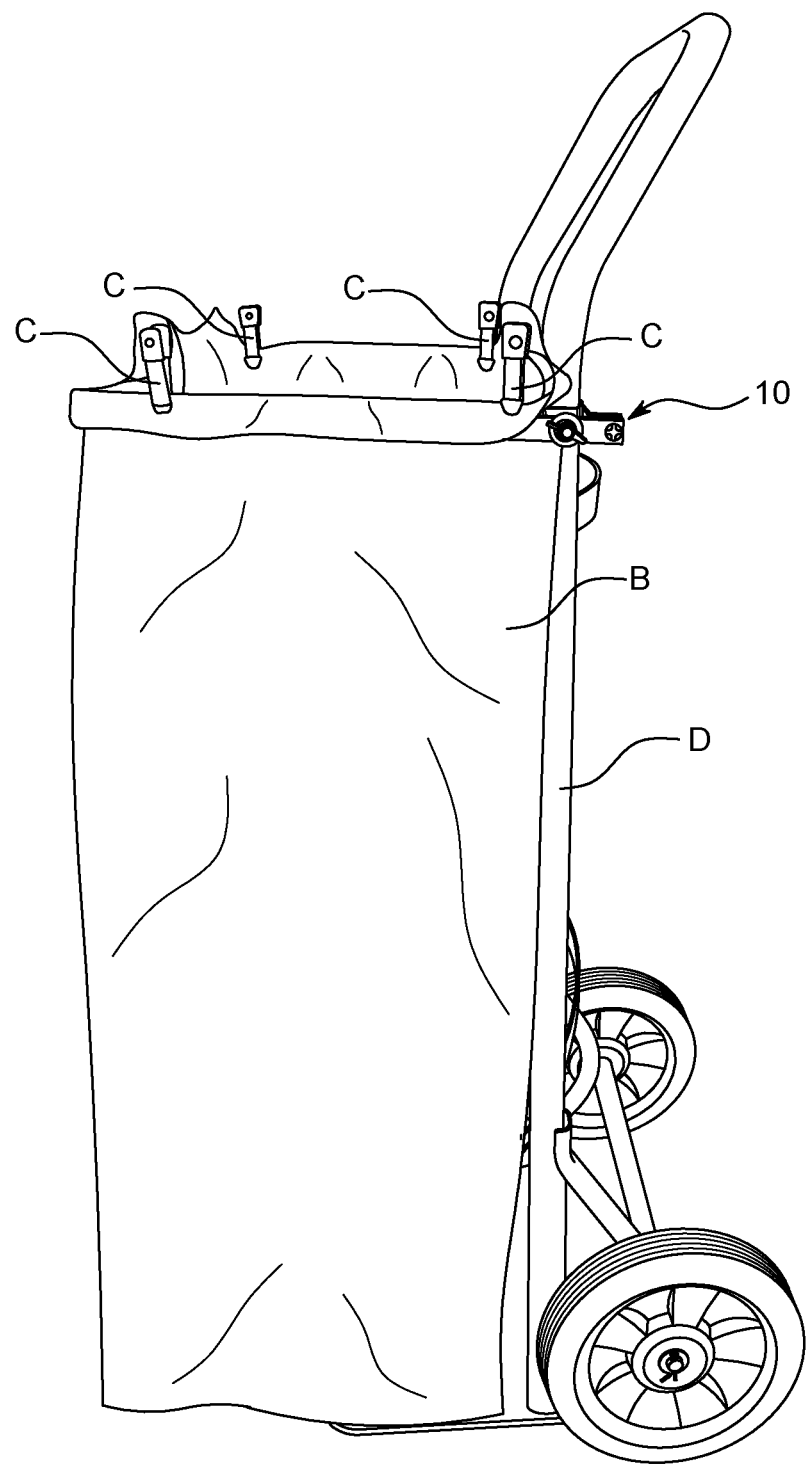

FIG. 6 demonstrates how the two-arm dolly attachment 10 attaches to a dolly in order to better secure an item such as a box in place;

FIG. 7 illustrates alternative storage means of two-arm dolly attachment 10; and FIG. 8 illustrates two-arm dolly attachment 10 holding a bag to show alternative functions of the present invention.

V. DETAILED DESCRIPTION OF THE EMBODIMENTS OF THE INVENTION

Referring now to the drawings, where the present invention, a two-arm dolly attachment, is generally referred to with numeral 10, it can be observed that it basically includes a first arm 20, a second arm 30, a first straight arm 40, a second straight arm 50, and two pairs of clasping members 60.

Figure 1:
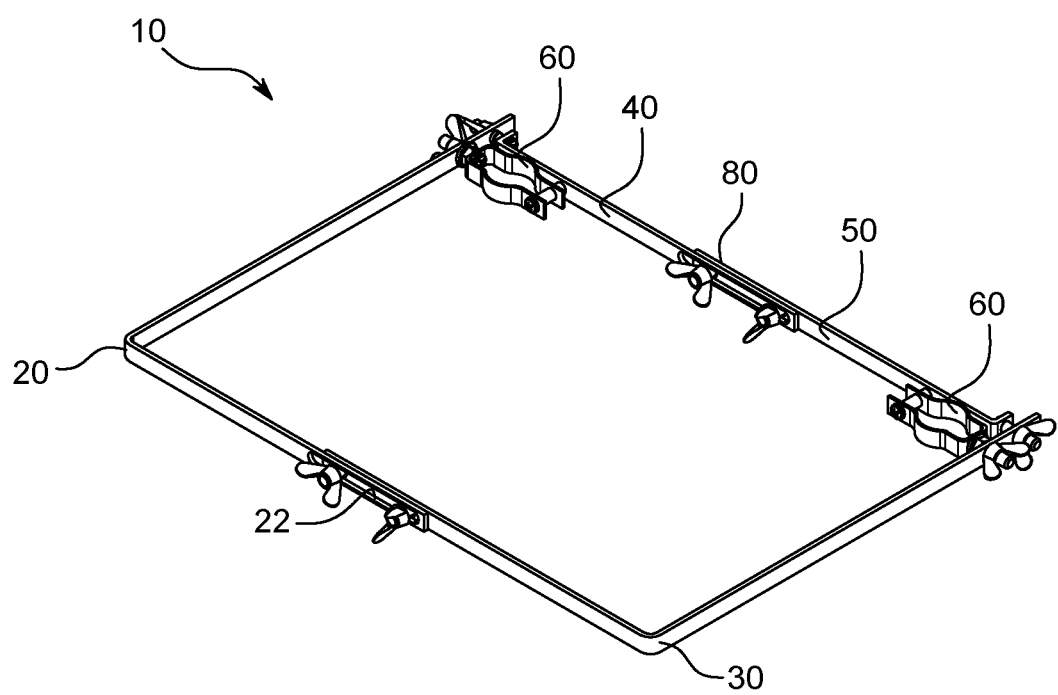
FIG. 1 illustrates an isometric view of the present invention the two-arm dolly attachment 10.
Figure 2:
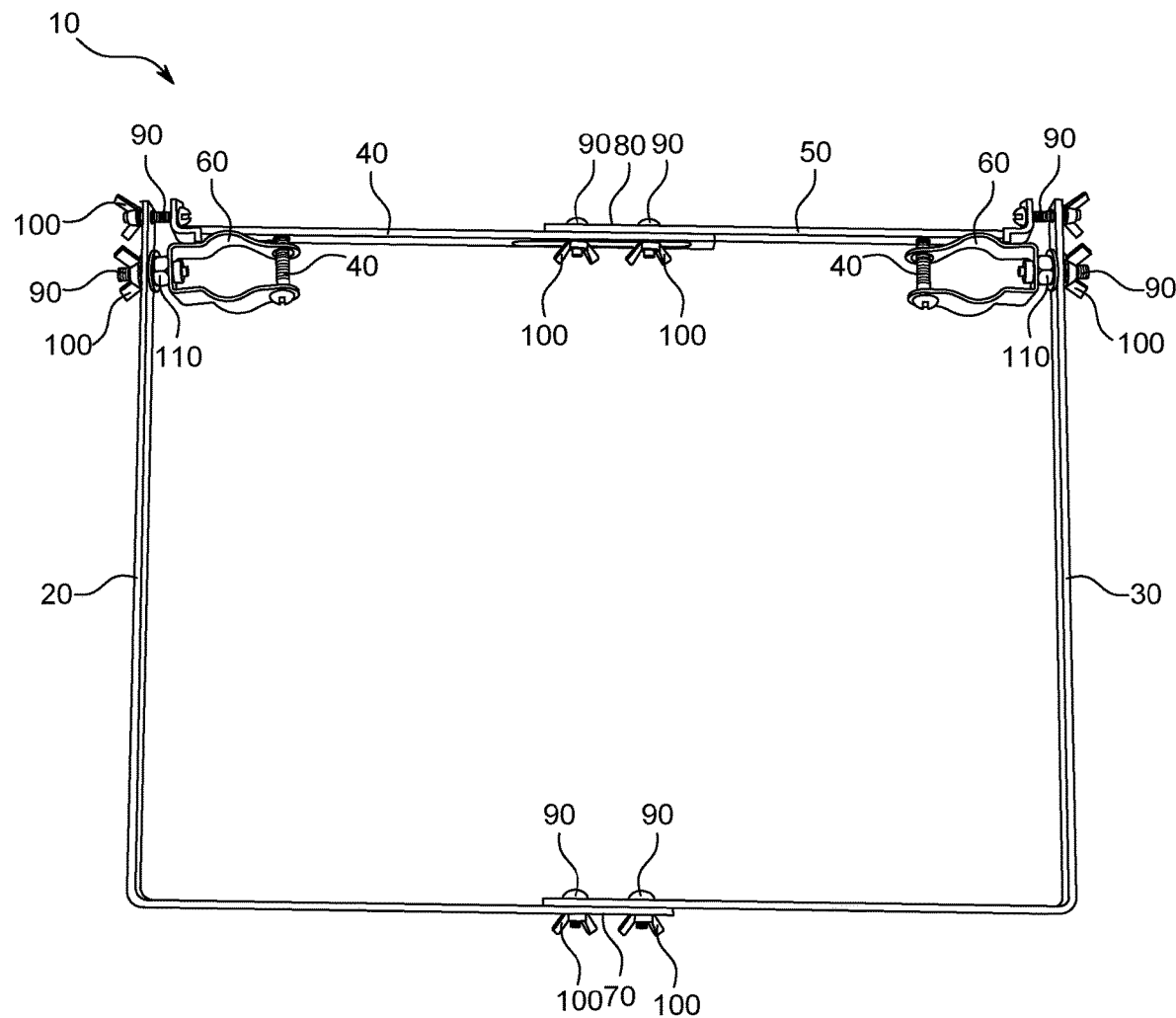
FIG. 2 shows a top view of the present invention the two-arm dolly attachment 10.

Referring to FIG. 1 and FIG. 2, it can be seen that an isometric view and a top view of the two-arm dolly attachment is provided. It can be seen that the present invention includes a first arm 20, a second arm 30, a first substantially straight arm 40, a second substantially straight arm 50 and two pairs of clasping members 60. The two-arm dolly attachment includes a front end 70 and a back end 80. Each of the first arm 20 and second arm 30 may be in an L shape. However, any other shape may be suitable. The first arm 20 may include a width adjusting opening 22, which is of a predetermined size and shape. While the second arm 30 may include multiple securing member openings 32, which may be of a predetermined shape and size. Additionally, the number of multiple securing member openings 32 may be any predetermined amount as per a user's needs. The first arm 20 is mounted in front of the second arm 30 at the front end 70 of the two-arm dolly attachment 10. Two of the multiple securing member openings 32 of the second arm 30 receive securing members 90 therethrough. The securing members 90 then continue to extend until the securing members 90 are received therethrough the width adjusting opening 22 of the first arm 20. The securing members 90 may be screws or any other suitable means that would fit through each of the multiple securing member openings 32 and the width adjusting opening 22. The securing members 90 may preferably be threaded. Once the securing members 90 have extended therethrough both the multiple securing member openings 32 and the width adjusting member opening 22 then each is received by a butterfly nut 100. The butterfly nut 100 may preferably be a butterfly nut but any other nut known in the art may be suitable. The butterfly nut 100 may preferably be a butterfly nut as to allow a user to quickly tighten and release of the first arm 20 and the second arm 30 to one another without requiring additional tools nor requiring much force.

It can further be seen in FIG. 1 and FIG. 2 that the present invention has additional components that attach to the first arm 20 and the second arm 30. Removably mounted to first arm 20 is first substantially straight arm 40 and removably mounted to second arm 30 is second substantially straight arm 50. There is an opening found on the first substantially straight arm 40 on a small L shaped portion which receives one of the securing members 90 therethrough, the securing member continues to extend until it is received therethrough by an opening found on the first arm 20. Once one of the securing members 90 has fully been received therethrough both of the openings it is secured and tightened by a butterfly nut 100. Thereby resulting in the first straight substantially arm 40 being mounted to the first arm 20. This same configuration for attaching the second substantially straight arm 50 to the second arm 30 also occurs. The first substantially straight arm 40 and the second substantially straight arm 50 removably attach or mount to one another at the back end 80 of the two-arm dolly attachment 10. The first substantially straight arm 40 may include a straight arm width adjusting opening 42, which may be of a predetermined size and shape. While the second substantially straight arm 50 may include multiple straight arm securing member openings 52, which may be of a predetermined shape and size. Additionally, the number of multiple straight arm securing member openings 52 may be any predetermined amount as per a user's needs. Similarity as previously mentioned for the first arm 20 and the second arm 30, the first substantially straight arm 40 is removably mounted or attached in front of the second substantially straight arm 50. Two of the multiple straight arm securing member openings 52 of the second straight arm 50 receive securing members 90 therethrough. The securing members 90 then continue to extend until the securing members 90 are received therethrough the straight arm width adjusting opening 42 of the first substantially straight arm 40. The securing members 90 may be screws or any other suitable means that would fit through the multiple straight arm securing member opening 52 and the straight arm width adjusting opening 42. Once the securing members 90 have extended therethrough both the multiple straight arm securing member openings 52 and the straight arm width adjusting member opening 42 then each is received by a butterfly nut 100. The butter nut 100 may preferably be a butterfly nut but any other nut known in the art may be suitable. The butterfly nut 100 may preferably be a butterfly nut as to allow a user to quickly tighten and release of the first substantially straight arm 40 and the second substantially straight arm 50 to one another without requiring additional tools nor requiring much force. The width adjusting opening 22 and the straight arm width adjusting opening 42 are what allow the present invention to be able to fit onto dollies of various sizes. The width adjusting opening 22 and the straight arm width adjusting opening 42 allow the two-arm dolly attachment 10 to expand or retract in size, more particularly in width.

The next component of the two-arm dolly attachment seen in FIG. 1 and FIG. 2 are two pairs of clasping members 60. One of the two pairs of clasping members 60 attaches to the first arm 20, while the other of the two pairs of clasping members 60 attaches to the second arm 30. The clasping members may be in a U-shaped configuration but are not limited to being in that shape. Each of two pairs of clasping members has an opening to receive a securing member 90 therethrough. The securing member 90 may then be received by a nut 110 in order to create spacing between each of the two pairs of clasping members 60 and each of either the first arm 20 or second arm 30. Finally, the securing member is received by an opening on each of the first arm 20 or second arm 30. In order to properly and safely secure each of the two pair of clasping members to each of the first arm 20 and second arm 30 a butterfly nut 100 is used to tighten the each of the securing members 90. The two pairs of clasping members 60 may be attached to any vertical portion of a dolly D of any size thereby resulting in the two-arm dolly attachment 10 being mounted to a dolly D.

Figure 3:
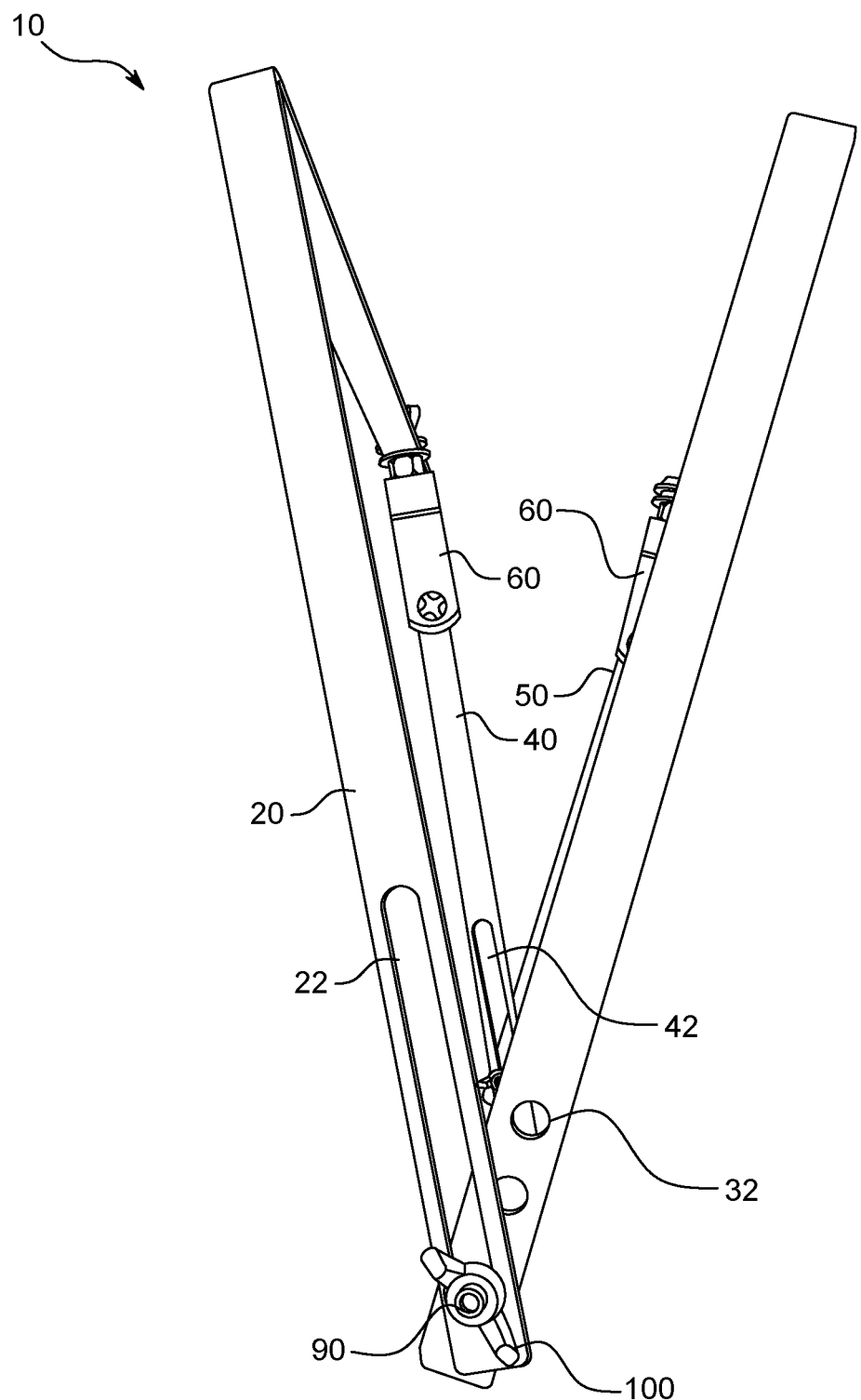
FIG. 3 illustrates how the two-arm dolly attachment 10 collapses for easy storage.

Referring to FIG. 3, the two-arm dolly attachment 10 can be seen. More specifically the two-arm dolly attachment 10 can be seen in a configuration in which it is collapsing. The present invention may be assembled and disassembled easily and quickly. Hence, why butterfly nut 100 is the preferred means of securing each of the securing members 90 to either one of the first arm 20, second arm 30, first substantially straight arm substantially 40 or second substantially straight arm 50. The butterfly nut 100 may be secured and released easily from each of the securing members 90 without a user needing more than their hands. Thereby permitting a user to store the two-arm dolly attachment 10 without taking up much space. Although it is not seen that the two-arm dolly attachment 10 is not fully collapsed in FIG. 3 it can be appreciated that the two-arm dolly attachment 10 can fully collapse in order to allow for easy storage and additionally easy transportation. Alternatively, as seen in FIG. 7, two-arm dolly attachment 10 may be stored in a different manner. Instead of entirely removing two-arm dolly attachment 10 from dolly D, two-arm dolly attachment 10 may be rotated about the top of dolly D to rest at the rear of dolly D. This allows a user to operate as they normally would without the two-arm dolly attachment 10 interfering. In the case that a user uses the two-arm dolly attachment 10 often this storage means may be more beneficial than entirely removing two-arm dolly attachment 10 two-arm dolly attachment 10 dolly D. This is achieved by slightly loosening the first arm 20 and second arm 30. Then securing first arm 20 and second arm 30 once it has reached the rear of dolly D. Thereby allowing a user to quickly bring out two-arm dolly attachment 10 to secure items thereon dolly D. This storage means may be quicker and beneficial for some users instead of entirely removing two-arm dolly attachment 10.

Figure 4:
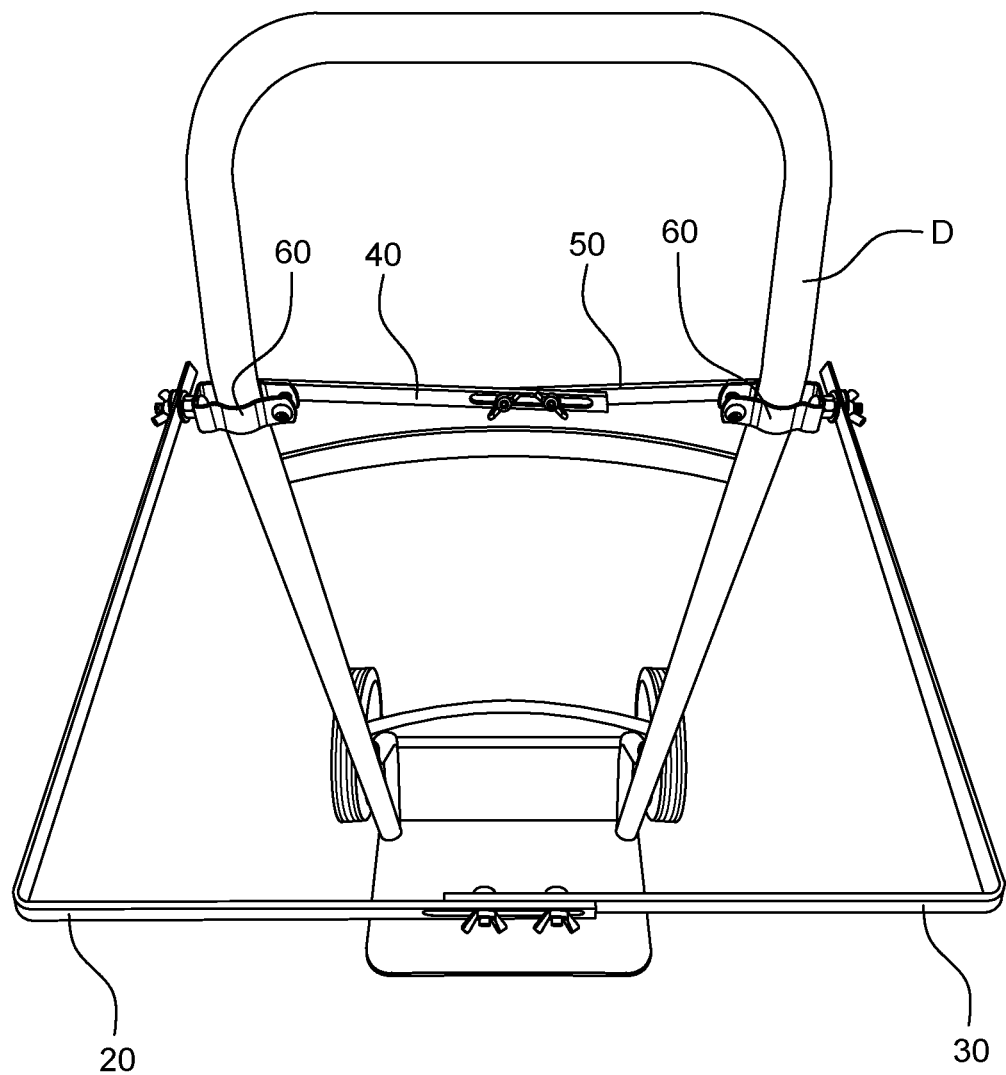
FIG. 4 is a representation of a top view of the two-arm dolly attachment 10 mounted to a dolly.
Figure 5:
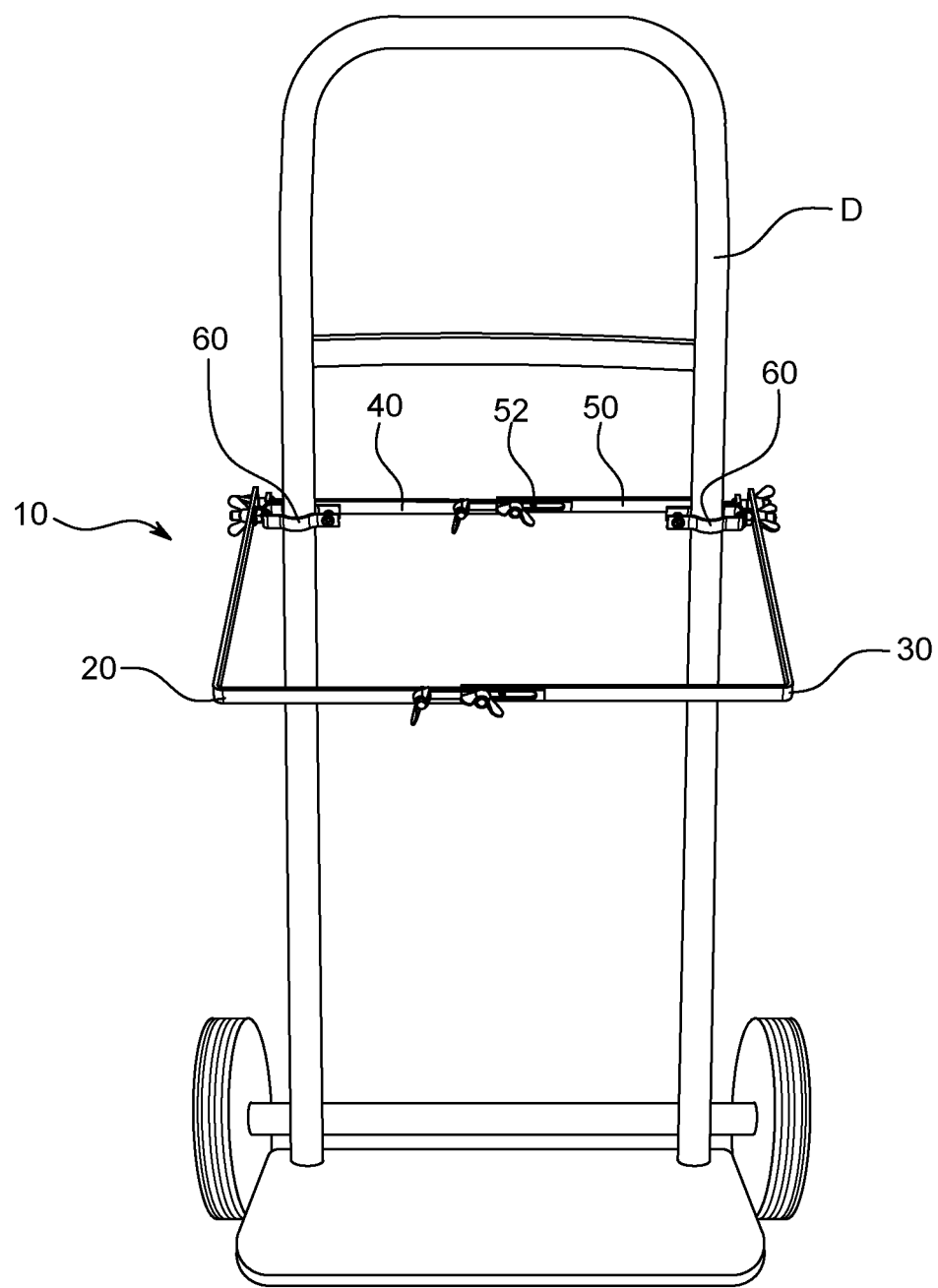
FIG. 5 is a front view of the two-arm dolly attachment 10 mounted to a dolly.

Referring to FIG. 4 and FIG. 5 it can be seen how the two-arm dolly attachment 10 mounts to a dolly D. FIG. 4 is a top view of the two-arm dolly attachment 10 exemplarily attached to dolly D. It can be seen that the two arm-dolly attachment 10 can mount to dolly D at various heights, thereby permitting a user to safely move objects on a dolly even if they are much shorter or taller than the dolly D. FIG. 5 is a front view that shows how the two-arm dolly 10 attaches to dolly D at a much lower height than what is seen in FIG. 4. Additionally, it should be understood that the two pairs of clasping members 60 also help the present invention attach to a dolly D of various thickness on the vertical arms as they are adjustable. The two pairs of clasping members 60 can be made to open or close more based on the needs of a user. Referring to FIG. 6 it can be seen how an object O is secured onto a dolly D with the use of two-arm dolly attachment 10. Alternatively, as seen in FIG. 8 a bag B may be mounted to two-arm dolly attachment 10. Bag B may be used to hold debris or the likes. For example, out in a yard where leaves need to be collected for proper disposal, bag B may be used to contain, store or transport the leaves. Bag B may be secured to two-arm dolly attachment 10 with the use of clamps C. Other suitable means may be used to attach a bag or container like bag B to two-arm dolly attachment 10. Other suitable means may be snap buttons, fasteners, hook and loop strap or the like as known in the art.

It should be understood that the present invention is not to be limited by materials such as metal. The present invention may be made by any suitable materials. Further, the two-arm dolly attachment 10 may be of any size as per the needs of a user. Additionally, any attaching means know in the art may be suitable to use with the present invention.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A two-arm dolly attachment, comprising:
   a. a first arm having a width adjusting opening;
   b. a second arm having multiple securing member openings;
   c. securing members, said securing members extend therethrough said multiple securing member openings and said width adjusting opening;
   d. a butterfly nut adapted to receive and secure each of the securing members;
   e. a first substantially straight arm having a straight arm width adjusting opening, wherein said first substantially straight arm mounts to said first arm with said securing members;
   f. a second substantially straight arm having multiple straight arm securing member openings, wherein said second substantially straight arm mounts to said second arm with said securing members; and
   g. two pairs of clasping members each mounted to one of either said first arm or said second arm with said securing members and said butterfly nut.

2. The two-arm dolly attachment of claim 1, wherein said two pairs of clasping members are spaced from either of said first arm or said second arm with a nut.

3. The two-arm dolly attachment of claim 1, wherein said securing members are threaded.

4. The two-arm dolly attachment of claim 1, where said two-arm dolly attachment is collapsible.

5. The two-arm dolly attachment of claim 1, wherein said butterfly nut is a nut instead.

6. The two-arm dolly attachment of claim 1, wherein said two-arm dolly attachment is adapted to attach to dollies of various sizes as said two-arm dolly attachment is adjustable in width.

7. The two-arm dolly attachment of claim 1, wherein an object or a bag is secured by the two-arm dolly attachment.

* * * * *